July 19, 1932.  M. COADOU  1,868,382
AUTOMOBILE BODY
Filed Feb. 27, 1930  3 Sheets-Sheet 1

Inventor:
Marcel Coadou,
Att'y.

July 19, 1932.  M. COADOU  1,868,382
AUTOMOBILE BODY
Filed Feb. 27, 1930  3 Sheets-Sheet 2

Inventor:
Marcel Coadou,
Atty.

July 19, 1932. M. COADOU 1,868,382
AUTOMOBILE BODY
Filed Feb. 27, 1930 3 Sheets-Sheet 3
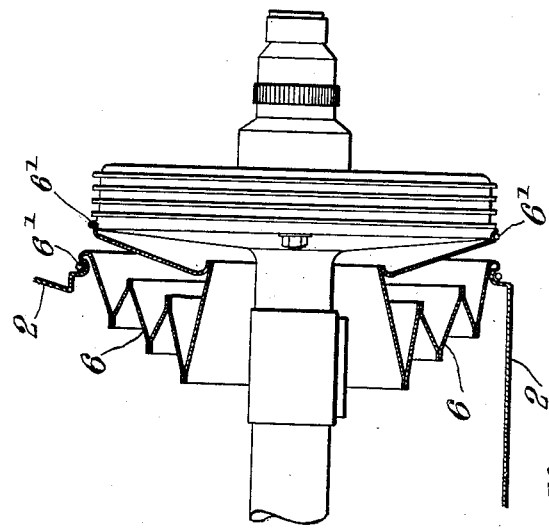
Fig. 6
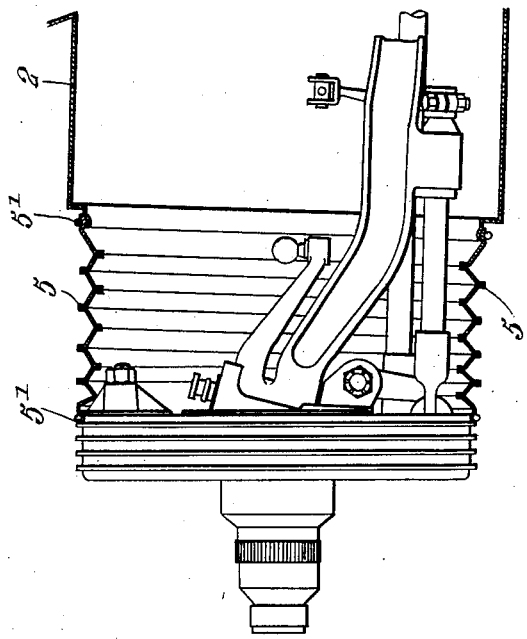
Fig. 5
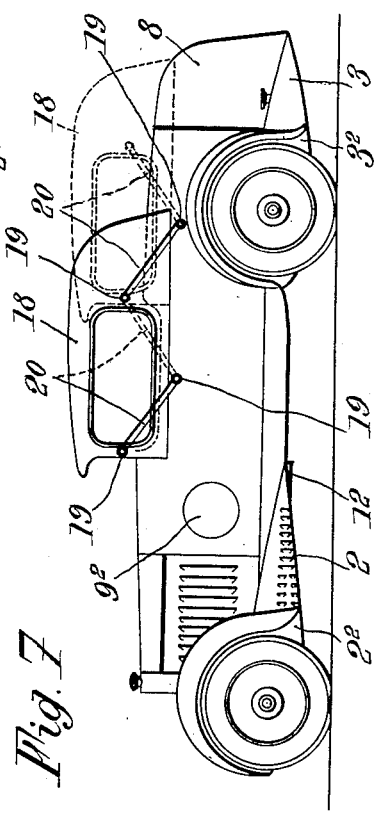
Fig. 7
Inventor:
Marcel Coadou,
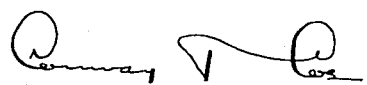
Att'y.

Patented July 19, 1932

1,868,382

UNITED STATES PATENT OFFICE

MARCEL COADOU, OF TREBEURDEN, FRANCE

AUTOMOBILE BODY

Application filed February 27, 1930, Serial No. 431,880, and in Belgium March 1, 1929.

The present invention relates to automobile bodies.

One of the objects of the invention is to provide a body capable of protecting the springs, stearing gear and similar structures adjacent the axles.

Another object is to provide a form of body having special aerodynamic qualities.

An additional object is to provide a novel form of door-less enclosed body.

Further objects will appear in the course of the detailed description now to be given with reference to the accompanying drawings, in which:

Fig. 1 represents, in perspective, one illustrative embodiment of the invention;

Fig. 2 illustrates the same structure in plan;

Figs. 5 and 6 are sections through the wheel-body assembly;

Fig. 7 shows a special form of doorless body.

Figure 3:
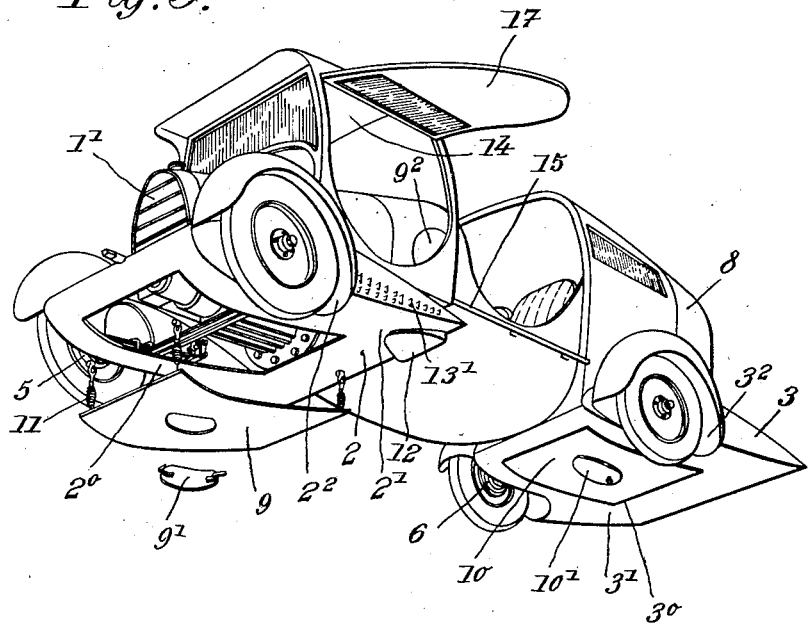
Fig. 3 is a perspective showing the under part of the same vehicle.

The automobile body consists of a main metallic body 1, which is fusiform and may be made for instance of sheets of steel or light metal, either cast or stamped, and either riveted or welded to a structure of the same metal so that, once connected to the chassis, the whole will stand all the strains due to the roughness of the road without deformation and without squeaking.

The main body really forms a beam of large cross section and receives at its front and rear ends two elements 2 and 3 profiled practically like a thick wing of an aeroplane, the advancing edge of which is placed at right angle to the direction in which the car moves.

The elements 2 and 3 are hollow and surround respectively the front and rear axles, their lower surfaces $2^1$ and $3^1$ being slightly curved. The main axis of these elements is practically horizontal and at a proper distance from the ground. On each of their sides, there is a portion $2^2$ and $3^2$ (see Fig. 1) which forms a recess for the car wheels. The four mud guards of the car body are made in the usual manner and are connected to the cross elements 2 and 3.

The latter are so arranged that they enclose not only the axles, but also all the parts which are attached to same, viz— steering gear, brakes, etc., and they efficiently protect these organs as well as all the connecting mechanism against the effects of bad weather.

On the other hand they do not hinder the oscillating movements of the springs and of the shock absorbers, nor the necessary movement of the steering gear and of all other control apparatus. For this purpose bellows 5 and 6 (Figs. 5 and 6) are used, made of leather, canvas, etc., and connect the sides of the fixed portions of the brake drums with the edges of the lateral openings of the elements. These bellows may advantageously be fastened by means of some clamping device, for instance, by means of a cable $5^1$ or $6^1$ equipped with a tightener, or by means of any other device which permits quick clamping and unclamping.

Where the motor-block passes through the hood, a circular or properly shaped piece of elastic material 7, for instance, rubber, canvas or leather, is used to form a tight joint between motor and hood. This also prevents the vibrations of the motor from reaching the interior of the car and thus helps to diminish the noise.

All the above mentioned parts are assembled so as to make the interior of the "habitable" body absolutely water-tight and to keep out all odors of oil or gasoline, fumes and steam.

The connection between the rear edge of element 3 and the main body 1 is made by means of a vertical part 8, which encloses the spare wheel and gets narrower toward the rear end, forming in fact a sort of upset T with element 3.

The form and arrangement of elements 2 and 3 and the fusiform shape of the whole body tend to reduce to a minimum the effect of the air resistance and to form a sort of leading line of direction through the air, which helps to hold the car well on the road at any speed, the effect of the latter being added to the effect of any counter wind.

A certain amount of air is caught beneath elements 2 and 3 and forms a sort of pneumatic cushion, which assists the action of the springs to an appreciable extent.

On the lower side of each of elements 2 and 3 there are openings 2° and 3° (Fig. 3) sufficiently large to permit easy access to any of the organs enclosed in said elements. Normally these openings are closed by means of covers 9 and 10, held in place by means of fingers, or similar devices, gripping the inside edge of said openings.

These covers may also be suspended by means of springs 11 attached to certain points on the chassis. Each cover may have a little opening, normally closed by plates $9^1$ or $10^1$, that can easily be removed, to allow a jack, or similar apparatus, to be placed against the axle in case it is desired to lift the same.

The burnt gases may be discharged through an opening 12 below the rear edge of element 2 where there is a strong suction which helps the exhaust of the gases. The gasoline tank may be placed inside element 3.

The exhaust pipe and the silencer are under the motor hood and in element 2. Air openings, such for instance as $13^1$ and $13^2$, may be used for admitting fresh air and eliminating the air which was heated through contact with these pipes.

Inspection port holes, easily opened, such as $9^2$ and $9^3$, may be arranged at convenient points in the sides of body 1 or elements 2 and 3.

The radiator $1^1$ is preferably fitted with horizontal pivoted shutters that may be used for regulating the fresh air supply to the radiator.

The arrangement specially shown in Figs. 1, 2 and 3 may be used, particularly in the case of so called "sedan" bodies, in order to reduce the height and to thoroughly enclose the occupants of the car.

Instead of using a fixed roof on the car and doors to get in and out, the roof and part of the sides may be made as one movable part 14, that may be displaced with reference to the rest of the car, for instance, by supporting part 14 on rails or guides 15 on both sides of the car and sliding part 14 on these rails by means of rollers 16.

Of course part 14 is sufficiently rigid to avoid any deformation when it is moved. Any appropriate means may be used for doing the moving, for instance a lever or a crank, but it is preferable to use a central force or one that is equal and simultaneous one both sides and symmetrical with reference to a vertical plane placed lengthwise through the center of the car.

A locking system is used to make one solid whole out of body 1 while the car is running.

The front end of the movable part may be used as a support for the windshield and an elastic gasket of rubber, leather, etc., may be placed all along the edge of the opening and where the rear end of the motor hood meets it.

Safety openings (Fig. 3) may be left in the sides of the movable part. These may normally be locked from the inside and opened only in case of accident or if for some other reason the movable part cannot be moved to allow the persons inside the car to get out.

These safety openings may for instance be closed by means of light plates 17 fitted into the sides of the movable part and fastened to the latter by means of hinges $17^1$ at the top, the plates being made to bear against the sides of the movable part at a sufficient number of points to insure complete rigidity and suppress all squeaking.

In the case of an open body of the touring car, or roadster, or similar type it is possible to add a rigid top 18, ordinarily called "balloon", in order to produce a closed car.

This arrangement eliminates the usual doors and decreases the height of the body, the movable top being for instance hinged to the fixed portion by means of hinges 19 that allow raising the top to get in and out of the car. In the case shown in Fig. 4, the hinges are placed across the car and on the ports of the windshield. However, the movable top may also be swung toward the rear or the side. Any other suitable means may also be used for fastening the movable top to the fixed portion of the car, for instance quadrilateral hinges 20 (Fig. 7) on the sides of the movable top, or rails on which the top may be made to slide. In any case the top may easily be tightened in place.

For instance, fasteners or clamps may be screwed or otherwise fitted in the windshield and in this way the "closed" car may readily be transformed into an "open" one.

Figure 4:
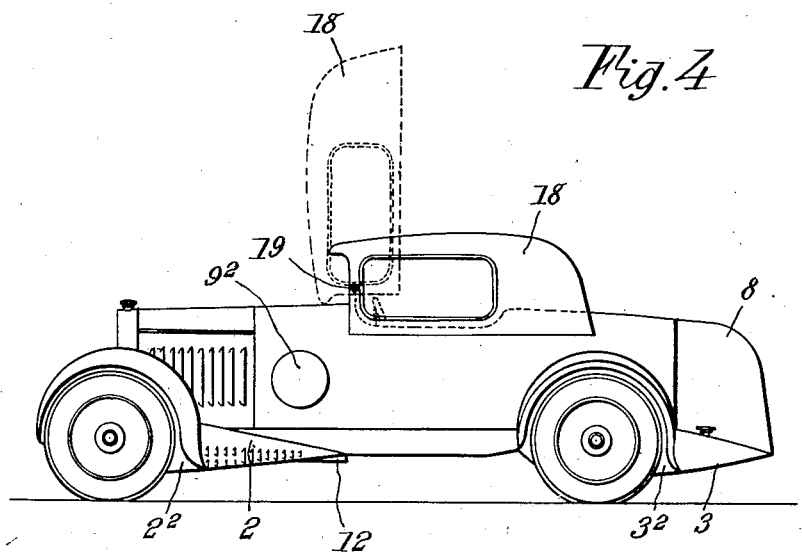
Fig. 4 shows, in elevation, a second embodiment of the invention.

The invention is not to be taken as limited to the structures shown in any particular figure: thus, body portions 18 in Figs. 4 and 7 may be mounted to slide backward on rails and wheels of the type of 15 and 16 shown in Fig. 1; body portion 14 may, conversely, be displaced on arms of the type of 20 in Fig. 7, etc.

What I claim is:

1. A closed body assembly to be mounted on a vehicle having an engine hood, said body assembly comprising two lateral walls extending below the top of said hood, a posterior wall and a roof, a rear section including the rear part of the lateral walls, the rear part of the roof and the posterior wall, said rear section being fixed relatively to the vehicle, and a rigid front section including the front part of the lateral walls and the front part of the roof, said front section being normally maintained in juxtaposition with said rear section and being slidable forwardly to permit access into said body.

2. A structure as defined in claim 1, in combination with a windshield fixed to said front section and constituting a front wall for said closed body assembly.

3. A structure as defined in claim 1, in combination with a lateral emergency door hingedly mounted on said front part of the lateral walls.

In testimony whereof I affix my signature.

MARCEL COADOU.